No. 783,525.                                                    Patented February 28, 1905.

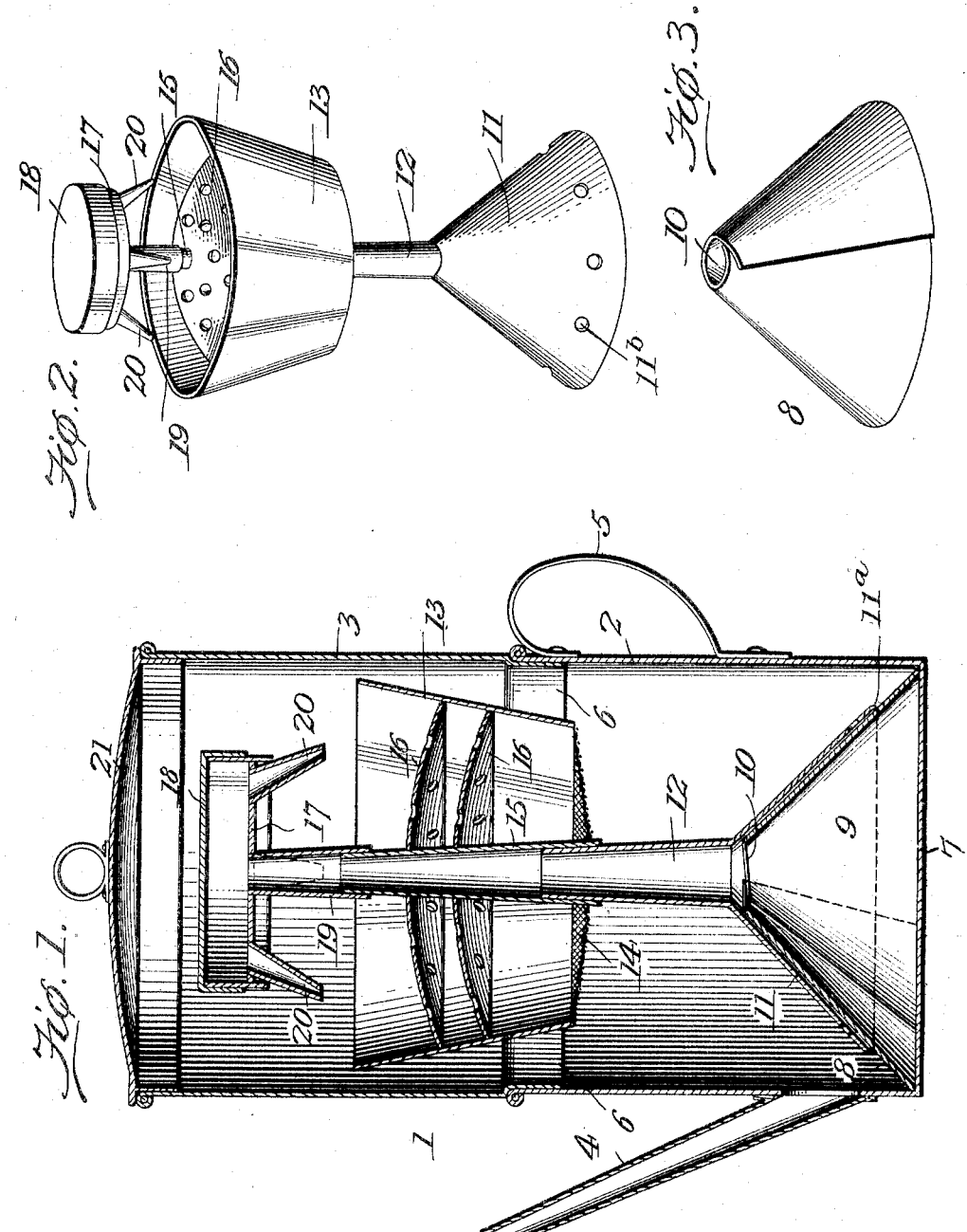

UNITED STATES PATENT OFFICE.

WILL S. JAMES, OF WAXAHACHIE, TEXAS.

COFFEE-POT.

SPECIFICATION forming part of Letters Patent No. 783,525, dated February 28, 1905.

Application filed July 31, 1903. Serial No. 167,793.

*To all whom it may concern:*

Be it known that I, WILL S. JAMES, a citizen of the United States, residing at Waxahachie, in the county of Ellis and State of Texas, have invented a new and useful Coffee-Pot, of which the following is a specification.

My invention relates to coffee-pots, and particularly to the class of devices which are employed for preparing drip-coffee, and has for its object to produce a device of this character of comparatively simple construction which will be efficient in operation and one in which the boiling water will be conducted to and discharged into the top of the coffee container or receptacle and allowed to percolate slowly through the coffee, thus drawing the entire strength of the same and at the same time obviating direct boiling.

A further object of the invention is to provide for the ready application of the device to pots varying in size and to obviate packing of the coffee in the container.

To these ends the invention comprises the novel details of construction and combination of parts more fully hereinafter described.

In the accompanying drawings, Figure 1 is a vertical longitudinal section through a coffee-pot having my invention applied thereto. Fig. 2 is a detail perspective view of the drip appliance removed. Fig. 3 is a similar view of the supplemental expansible bottom.

Referring to the drawings, 1 indicates a coffee-pot or other suitable vessel which is preferably made in two sections 2 and 3, as herein shown, the lower section being provided with a spout 4 and handle 5 and the upper section 3 provided with a reduced flange 6, fitting the mouth of the lower section, whereby the former is removably attached to the latter for the purpose which will hereinafter appear.

Disposed within the pot 1 and resting upon its primary bottom 7 is a supplemental cone-shaped bottom 8, which in conjunction with the primary bottom forms a generating-chamber 9, provided with an upper central escape-opening 10, produced by truncating the conical bottom 8. This latter is formed from a suitable blank of spring metal bent to shape with its ends free, as shown more clearly in Fig. 3, thus producing an expansible bottom which may be readily adapted to vessels of varying diameters, and may further be compressed or reduced in diameter for entrance into the reduced mouth of a pot, and will then expand automatically to the size of the bottom of the pot and entirely covering the same. Through this feature of the expansible supplemental bottom the device may be readily applied to pots of varying sizes.

Disposed upon the supplemental bottom 8 and conforming in shape thereto is the enlarged mouth 11 of a vertically-disposed conducting-tube 12, extending upward into the upper section 3 of the vessel, the mouth 11 serving the further function of a supporting-base for the tube and devices carried by the latter. The lower end of the mouth is provided with an inturned flange or bead $11^a$, which bears against the supplemental bottom and serves to hold the mouth spaced therefrom to form an annular chamber, into which the water from the section 2 passes through a series of openings $11^b$, formed in the mouth adjacent to its lower end.

13 is a receiver provided with an open-work bottom 14, having a central opening from which arises a tube 15, seated at its lower end upon the upper end of tube 12, of which latter it forms, in effect, an upper section or continuation. The receiver 13, which in practice contains the charge of coffee, is provided with one or more concavo-convex perforated partitions 16, disposed with the concaved side downward, as shown more clearly in Fig. 1. These partitions subserve the function of preventing the coffee from becoming packed in the receiver by the passage of water through the latter.

17 is a cup-shaped member or distributer, provided with a cover 18 and a central depending tube 19, which fits upon the upper end of tube 15. The distributer is also provided in its bottom with depending outwardly-inclined discharge-tubes 20.

The pot or vessel 1 is provided with a lid or cover 21, having a depending flange designed to fit the mouth of either of the sections 2 or 3.

In practice the vessel is filled with water to the extent of its lower section 2, and this water as it boils and is expanded by the heat flows upward through the central conducting-tube to the distributer 17, from which it flows through the discharge-tubes 20 and is directed by the latter downward upon the coffee in the underlying container 13, through which and the mass of coffee it slowly percolates and passes off through the open-work bottom 14 back into the vessel. Thus it will be seen that the full strength of the coffee is drawn and this without direct boiling, which latter, as is well known, materially impairs the flavor of the coffee. After the coffee has been prepared in the above manner the upper section 3 of the vessel is removed, as is also the inner drip mechanism, and the cover 21 is applied over the lower section 2, in which the coffee may be served.

From the foregoing it will be seen that I produce a device of comparatively simple construction which in practice will admirably perform its functions to the ends in view, in the attainment of which I do not wish to limit myself to the precise details herein set forth, inasmuch as minor changes may be made therein without departing from the spirit of the invention.

Having thus described my invention, what I claim is—

1. In a coffee-pot, the combination with the pot proper, of a conical supplemental bottom, a mouth fitting over the bottom and provided at its lower edge with a circumferential bead or flange which bears against the bottom to form an annular chamber between the parts, the mouth being provided adjacent to its lower end with openings to permit water to the chamber, a conducting-tube constituting a continuation of the mouth, a distributer carried by the upper end of the tube, and a receiver arranged below the distributer.

2. In a coffee-pot, the combination with the pot proper of a removable expansible cone-shaped supplemental bottom, a cone-shaped mouth fitting over the mouth and having its lower edge provided with an inturned flange or bead to hold it spaced from the bottom, the mouth being provided adjacent to its lower edge with a series of openings through which water passes to the chamber, a conducting-tube projecting upward from the mouth, a distributer carried by the upper end of the tube and a receiver disposed beneath the distributer.

In testimony that I claim the foregoing as my own I have hereto affixed my signature in the presence of two witnesses.

WILL S. JAMES.

Witnesses:
L. H. BUSHNELL,
J. W. EAU.